United States Patent [19]

Rosebrooks

[11] Patent Number: 4,688,515
[45] Date of Patent: Aug. 25, 1987

[54] COATING HEAD ASSEMBLY FOR ELONGATED STRANDS

[75] Inventor: Nathan B. Rosebrooks, W. Thompson, Conn.

[73] Assignee: Sancliff, Inc., Jefferson, Mass.

[21] Appl. No.: 841,894

[22] Filed: Mar. 20, 1986

[51] Int. Cl.⁴ .............................................. B05C 3/15
[52] U.S. Cl. .................................. 118/405; 118/420; 118/DIG. 18; 118/125
[58] Field of Search ............... 118/405, 404, DIG. 18, 118/125, 420

[56] References Cited

U.S. PATENT DOCUMENTS

| | | | |
|---|---|---|---|
| 3,737,490 | 6/1973 | Nicholson | 264/40 |
| 4,263,348 | 4/1981 | Renegar | 118/405 X |
| 4,309,160 | 1/1982 | Poutanen et al. | 425/113 |
| 4,341,509 | 7/1982 | Harlow | 425/114 |
| 4,419,958 | 12/1983 | Roba | 118/405 |
| 4,510,884 | 4/1985 | Rosebrooks | 118/405 |

Primary Examiner—John P. McIntosh

[57] ABSTRACT

A split coating head assembly for elongated strands, the assembly comprising first and second mounting blocks with first and second die components respectively mounted therein, the die components defining therebetween a coating chamber which is in communication with a pressurized source of coating material, the die components forming upper and lower apertures for drawing of the strand vertically therethrough, and through the coating chamber.

3 Claims, 7 Drawing Figures

COATING HEAD ASSEMBLY FOR ELONGATED STRANDS

BACKGROUND OF THE INVENTION

1. Field of the Invention

The invention relates to a strand coating device, and more particularly to a head assembly for pressurized coating of optical fibers.

2. Description of the Prior Art

The coating of elongated strands of fiber material, such as glass fibers used in fiber optics, has been accomplished by a method referred to generally as the "open cup" method, which is illustrated and described in U.S. Pat. No. 4,419,958, issued Dec. 13, 1983 to Giacomo Roba. Utilizing such method, fibers of silica glass are passed in a downward direction through a mass of liquid resin contained in a reservoir which terminates in a converging outlet duct. The reservoir and outlet duct are referred to by Roba as the "nozzle". After the fiber emerges from the duct, its resin coating is allowed to set by drying or curing. To facilitate the insertion of the fiber under traction into the nozzle, the nozzle body of Roba is split into two parts with complementary cavities defining the passage.

In U.S. Pat. No. 4,510,884, issued Apr. 16, 1985 to Nathan B. Rosebrooks, there is shown and described a device for coating an optical fiber in which the coating material is supplied to chamber under pressure and the fiber strand is drawn downwardly through the chamber. Using the pressurized chamber, the Rosebrooks device facilitates the movement of the fiber through the device at a substantially higher rate of speed than is the case with a device of the Roba type.

SUMMARY OF THE INVENTION

An object of the present invention is to provide a split coating head assembly for elongated strands, such as optical fibers, the assembly including first and second complementary mounting blocks, each mounting block having therein upper and lower half-dies, the dies defining therebetween a coating chamber in communication with a pressurized reservoir of coating material. The mounting blocks and upper and lower half-dies are joined together to form a substantially closed system, but are readily separable to permit cleaning, and/or removal of broken fibers.

With the above and other objects in view, as will hereinafter appear, a feature of the present invention is the provision of a coating head assembly for elongated strands, the assembly comprising a first mounting block, half-die means disposed in the first mounting block, a second mounting block, and half-die means disposed in the second mounting block, the mounting blocks being adapted to be joined together to join the half-die means together, the half-die means and the mounting blocks, when joined, forming a coating chamber, the assembly being adapted to have an elongated strand moved continuously therethrough, one of the mounting blocks being adapted to convey a coating material therethrough to the coating chamber to coat the strand during its continuous movement through the assembly.

The above and other features of the invention, including various novel details of construction and combinations of parts, will now be more particularly described with reference to the accompanying drawings and pointed out in the claims. It will be understood that the particular device embodying the invention is shown by way of illustration only and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings

DESCRIPTION OF THE PREFERRED EMBODIMENT

Figure 1:
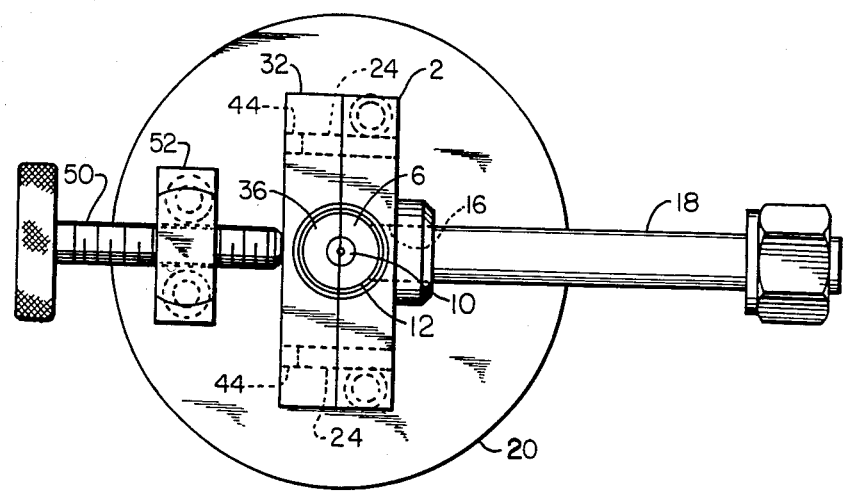
FIG. 1 is a top plan view of the coating head assembly, illustrative of an embodiment of the invention.

Referring to the drawings, it will be seen that an illustrative assembly includes a first mounting block 2, preferably of stainless steel, having a first recess 4 therein. Disposed in the first recess 4 is a first upper half-die 6 and, thereunder, a first lower half-die 8. Each of the first half-dies 6, 8 is provided with a tapered outlet 10, and is preferably of tungsten carbide. The first half-dies 6, 8 are machined to fit precisely in the first recess 4 and are permanently fixed therein by brazing material 12.

The first half-dies 6, 8 are spaced from each other in the first recess 4 to provide a first portion 14 of a coating chamber. The first mounting block 2 is provided with a passage 16 extending therethrough to the coating chamber first portion 14. A conduit 18 is fixed to the first mounting block 2 and is in communication with a pressurized source (not shown) of a selected coating material, for example an ultra violet light curable urethane acrylate, a thermally curable silicone and/or epoxy, or the like.

Figure 2:
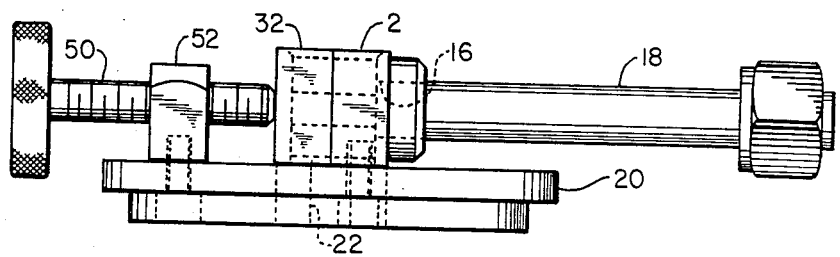
FIG. 2 is a side elevational view thereof.
Figure 3:
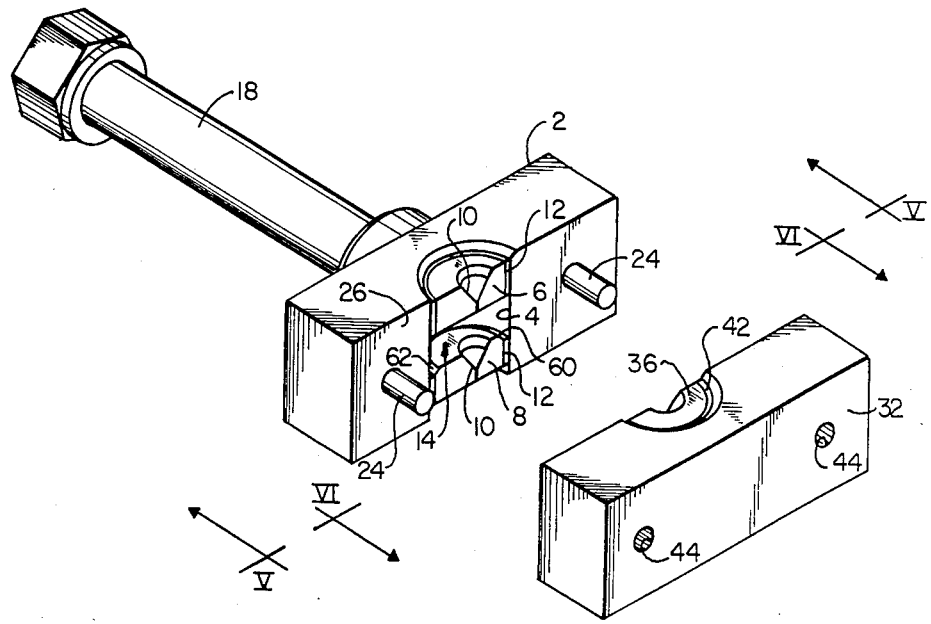
FIG. 3 is a perspective view of the assembly, showing the first and second mounting blocks separated.

The first mounting block 2 is mounted on a platen 20 having an aperture 22(FIG. 2) therein, and is provided with a pair of protrusions 24 extending from a face portion 26 of the first mounting block.

The assembly further includes a second mounting block 32, preferably of steel, having a second recess 34 (FIG. 6) therein. Disposed in the second recess 34 is a second upper half-die 36 and, thereunder, a second lower half-die 38. Each of the second half-dies is substantially a mirror image of the first half-dies, upper and lower respectively, and the second half-dies are provided with tapered outlets 40 complementary to the tapered outlets 10 of the first half-dies. A brazing material 42 permanently fixes the second half-dies 36, 38 in the second recess 34.

The second upper and lower half-dies 36, 38 are spaced from each other in the second recess 34 to provide second portion 41 (FIG. 6) of the above-mentioned coating chamber.

The second mounting block 32 is provided with a pair of bores 44 disposed in a face portion 46 complementary to the first mounting block face portion 26. The bores 44 are adapted to receive the protrusions 24, to ensure proper alignment of the mounting blocks 2, 32, and thereby the respective half-dies.

Figure 4:
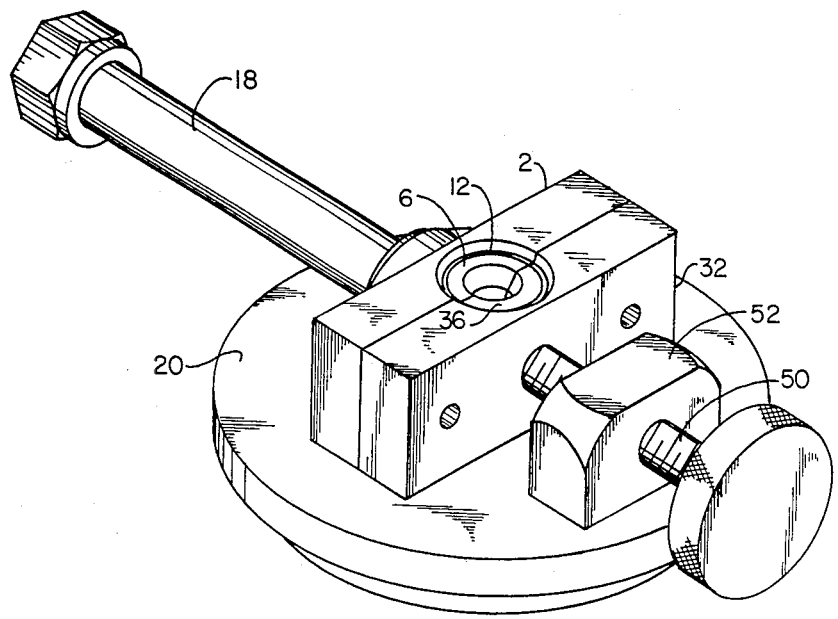
FIG. 4 is a perspective view of the assembly, shown disposed on a platen and shown in the closed position with means shown for retaining the assembly in the closed position.

The platen 20 is adapted to receive the second mounting block 32 thereon in opposition to the first mounting block 2. Joining of the two mounting blocks 2, 32 is accomplished by placing the mounting block face portions 26, 46 in abutting position (FIG. 4). The first and second upper half-dies 6, 36 are precisely aligned with each other such that they come together to form a complete upper die 6, 36; in like manner, joining of the first and second lower half-dies 8, 38 forms a complete lower die 8, 38, the upper and lower dies having outlets 10, 40 defined by the dies and in alignment with each other and with the platen aperture 22. The dies further form a coating chamber comprising the two chamber portions 14, 41.

The platen 20 preferably is provided with a mechanism for retaining the mounting blocks 2, 32 in tightly abutting relationship; as illustrated, the mechanism may be a screw 50 retained in a block 52 and adapted to impinge upon the moveable mounting block, i.e. the second mounting block 32.

In operation, the first and second mounting blocks 2, 32 are closed together about an optical fiber (not shown) which extends through the upper and lower tapered outlets 10, 40 and through the platen aperture 22. In closing, the protrusions 24 of the first mounting block enter the bores 44 of the second mounting block to accurately align the two half-die sets, and the two mounting block faces 26, 46 abuttingly engage. Turning the screw 50 serves securely to join the two mounting blocks with the optical fiber extending therebetween.

Figure 5:
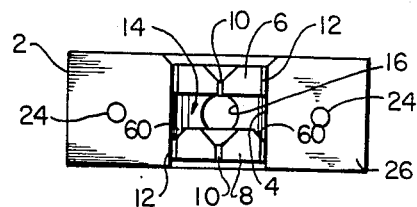
FIG. 5 is a sectional view, taken along line V—V of FIG. 3.
Figure 6:
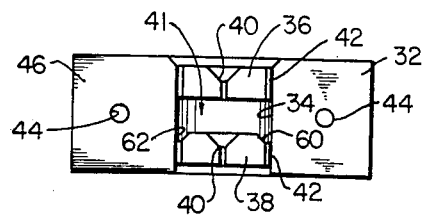
FIG. 6 is a sectional view, taken along line VI—VI of FIG. 3.

Referring to FIGS. 5 and 6 it will be seen that the lower half-dies 8, 38 are each chamfered to present a bevel surface 60 which effectively enlarges the coating chamber 14, 41, forming an enlarged annular gallery 62. The gallery 62 serves to distribute the coating material more uniformly around and onto the fiber. In some applications it is desirable to enlarge the gallery further, and such may be accomplished by extending the gallery into the mounting blocks, that is, by hollowing out portions 70 of the mounting blocks adjacent the gallery 62, as illustrated in FIG. 7.

Figure 7:
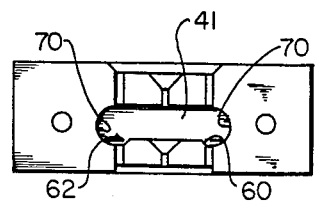
FIG. 7 is a sectional view, similar to FIG. 6, but illustrative of an alternative embodiment.

By operation of valve means (not shown) connected to the above-referred-to pressurized reservoir of coating material, the material is caused to flow from the reservoir, through the conduit 18, the passage 16, and into the coating chamber 14, 41, and the gallery 62 (as well as the hollowed out portions 70 in the embodiment illustrated in FIG. 7), from whence the material impinges upon and coats the surgace of the optical fiber.

The fiber is drawn vertically downwardly through the device, such that the fiber is continuously coated.

In the event of clogging of the device, breakage of the fiber, and the like, the operation is stopped, the screw 50 loosened, and the mounting blocks separated to provide quick and easy access to the coating chamber and tapered outlets. Because of the ease of cleaning and repairing, the "down" time of the device is minimal.

It is to be understood that the present invention is by no means limited to the particular construction herein disclosed and/or shown in the drawings, but also comprises any modifications or equivalents within the scope of the disclosure.

Having thus described my invention, what I claim as new and desire to secure by Letters Patent of the United States is:

1. A coating head assembly for elongated strands, said assembly comprising a first mounting block, a second mounting block complementary to and opposed to said first mounting block, a first upper half-die mounted in a first recess in said first mounting block, a first lower half-die mounted in said first recess in said first mounting block, a second upper half-die mounted in a second recess in said second mounting block, a second lower half-die mounted in said second recess in said second mounting block, said first and second upper half-die being complementary to and opposed to each other, said first and second lower half-dies being complementary to and opposed to each other, said first and second mounting blocks being adapted to be joined together with said first upper half-die abutting said second upper half-die and said first lower half-die abutting said second lower half-die, said upper and lower dies defining therebetween a coating chamber, said first and second lower half-dies being chamfered to provide an annular bevel surface which defines in part an enlarged annular gallery as a position of said chamber, portions of said mounting blocks adjacent said chamber being hollowed out to provide an annular extension of said gallery, a conduit connected to said first mounting block and in communication with said coating chamber, said conduit being adapted for further communication with a reservoir of coating material, and means for releasably retaining said first and second mounting blocks in said joined relationship, said upper dies forming an upper aperture and said lower dies forming a lower aperture in alignment with said upper aperture to facilitate passage therethrough of an elongated strand.

2. The coating head assembly in accordance with claim 1, in which said upper and lower dies are spaced from each other by a distance less than the maximum height of said gallery.

3. The coating head assembly in accordance with claim 2, in which said coating chamber is substanially closed.

* * * * *